(12) United States Patent
Haas et al.

(10) Patent No.: US 10,544,720 B2
(45) Date of Patent: Jan. 28, 2020

(54) SYSTEM AND METHOD FOR MANAGING CONTAMINANT STORAGE IN A STORAGE CATALYST

(71) Applicant: Cummins Inc., Columbus, IN (US)

(72) Inventors: Michael Haas, Columbus, IN (US); Krishna Kamasamudram, Columbus, IN (US); Ashok Kumar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 77 days.

(21) Appl. No.: 15/408,799

(22) Filed: Jan. 18, 2017

(65) Prior Publication Data

US 2017/0226911 A1 Aug. 10, 2017

Related U.S. Application Data

(60) Provisional application No. 62/291,692, filed on Feb. 5, 2016.

(51) Int. Cl.
*F01N 3/20* (2006.01)
*F01N 9/00* (2006.01)

(52) U.S. Cl.
CPC ......... *F01N 3/2053* (2013.01); *F01N 3/2006* (2013.01); *F01N 3/2066* (2013.01);
(Continued)

(58) Field of Classification Search
CPC ............... F01N 11/002; F01N 2410/06; F01N 2550/02; F01N 2610/02; F01N 3/106;
(Continued)

(56) References Cited

U.S. PATENT DOCUMENTS 7,263,824 B2 9/2007 Bellinger et al.
7,472,545 B2 * 1/2009 Hemingway ......... F01N 3/0814
48/197 R (Continued)

FOREIGN PATENT DOCUMENTS

JP 2013245616 12/2013

*Primary Examiner* — Thai Ba Trieu
*Assistant Examiner* — Diem T Tran
(74) *Attorney, Agent, or Firm* — Taft Stettinius & Hollister LLP

(57) ABSTRACT

An internal combustion engine system includes an engine and an aftertreatment system that is connected to the engine to receive an exhaust flow from the engine. The aftertreatment system includes a contaminant storage catalyst for storing contaminants produced by the engine during cold start and low temperature operating conditions, and a $NO_x$ reduction catalyst downstream of the storage catalyst for receiving the contaminants released from the storage catalyst when temperature conditions in the exhaust flow and/or $NO_x$ reduction catalyst are above an effective temperature threshold for $NO_x$ reduction. A contaminant amount stored on the storage catalyst can be estimated in response to one or more operating parameters to manage a storage capacity of the storage catalyst. A bypass can used to bypass the storage catalyst to preserve storage capacity for a subsequent cold start condition.

18 Claims, 4 Drawing Sheets

(52) U.S. Cl.
CPC ............ *F01N 9/00* (2013.01); *F01N 2410/06* (2013.01); *F01N 2610/02* (2013.01)

(58) Field of Classification Search
CPC .... F01N 3/2006; F01N 3/2053; F01N 3/2066; F01N 9/00
USPC .................................. 60/286, 295, 301, 303
See application file for complete search history.

(56) References Cited

U.S. PATENT DOCUMENTS

| | | | | |
|---|---|---|---|---|
| 8,006,480 | B2 * | 8/2011 | McCarthy, Jr. .... | B01D 53/9409 60/274 |
| 8,037,674 | B2 | 10/2011 | Kupe et al. | |
| 8,191,354 | B2 | 6/2012 | Cavataio et al. | |
| 8,635,855 | B2 * | 1/2014 | Mital ...................... | F01N 3/035 60/274 |
| 8,713,919 | B2 * | 5/2014 | Gonze ..................... | F01N 3/103 60/286 |
| 8,857,154 | B2 * | 10/2014 | Mehta ................... | F01N 3/0871 60/274 |
| 8,938,948 | B2 | 1/2015 | Roberts, Jr. et al. | |
| 2009/0308057 | A1 * | 12/2009 | Fresnet ................ | F01N 3/0253 60/287 |
| 2013/0028818 | A1 * | 1/2013 | Eckhoff ................ | F01N 3/0814 423/212 |
| 2015/0176454 | A1 | 6/2015 | Dreves et al. | |

\* cited by examiner

SYSTEM AND METHOD FOR MANAGING CONTAMINANT STORAGE IN A STORAGE CATALYST

CROSS-REFERENCE TO RELATED APPLICATION

The present application claims the benefit of the filing date of U.S. Provisional Application Ser. No. 62/291,692 filed on Feb. 5, 2016, which is incorporated herein by reference.

TECHNICAL FIELD

This disclosure relates to a system and method for controlling and managing $NO_x$ and/or hydrocarbons storage on a $NO_x$ storage catalyst that are produced by internal combustion engine operations during cold start and low temperature conditions so that the $NO_x$ storage catalyst has $NO_x$ storage capacity in a subsequent cold start or low temperature operating condition.

BACKGROUND

During cold start of an internal combustion engine, the temperature of a $NO_x$ reduction catalyst and other components in the aftertreatment system may be insufficient for efficient or effective operation to remove $NO_x$ and other constituents from the exhaust gas. For example, a selective catalytic reduction (SCR) catalyst may be insufficient to initiate $NO_x$ conversion or to provide efficient $NO_x$ conversion at cold start or low temperature operating conditions. Therefore, $NO_x$ storage catalysts have been adopted that meet increasingly stringent emissions control requirements during cold start conditions. These $NO_x$ storage catalysts temporarily store $NO_x$ during cold start conditions and release $NO_x$ and hydrocarbons at higher temperatures when the downstream SCR device is effective for immediate $NO_x$ conversion. The $NO_x$ and hydrocarbons released from the $NO_x$ storage catalyst are treated at a downstream $NO_x$ reduction catalyst.

While $NO_x$ storage catalysts have improved reduction of $NO_x$ and HC emissions during cold start and low temperature operating conditions, there remain deficiencies in their implementation. For example, if engine operations are terminated while the $NO_x$ storage catalyst has little or no storage capacity, then $NO_x$ and hydrocarbon storage capabilities are not available during a subsequent cold start. Therefore, further contributions in this area are needed.

SUMMARY

There is disclosed an internal combustion engine system that includes an engine, an aftertreatment system, and an exhaust flow path connecting the aftertreatment system to the engine. The aftertreatment system includes at least one storage catalyst for storing a contaminant such as $NO_x$ and/or hydrocarbons, and a $NO_x$ reduction catalyst downstream of the storage catalyst. Systems, apparatus, and methods are disclosed for estimating or determining a contaminant amount stored on the storage catalyst, and for initiating a stored contaminant reduction event in response to the contaminant amount exceeding a threshold to reduce the contaminant amount stored on the storage catalyst, thereby increasing an available storage capacity of the storage catalyst.

Various operating outputs in response to a stored contaminant reduction event are contemplated. For example, the stored contaminant reduction event can include one or more operating outputs for thermal management of the exhaust stream temperature to increase and/or maintain the temperature of the storage catalyst at a temperature sufficient to release contaminants therefrom and reduce the contaminant amount that is stored thereon. Example operating outputs for thermal management of the exhaust stream include any one or combination of hydrocarbon dosing, rich engine operations, exhaust heaters, substrate heaters, fuel burners, and control of engine operating levers (such as increase idle speed or engine load). These operating outputs can be used to increase/maintain exhaust temperatures and reduce contaminants stored on the storage catalyst to increase an available storage capacity.

In another embodiment, the storage capacity of the storage catalyst is managed by providing a bypass around the storage catalyst. The bypass can include an oxidation catalyst, or can be an empty flow path. During cold start conditions, exhaust flow is directed through the storage catalyst. Exhaust flow is also directed through the storage catalyst during DPF regeneration for the empty flow path embodiment. When the $NO_x$ storage catalyst reaches a temperature in which its contaminant storage capability is low and little or no contaminants are stored on the storage catalyst, exhaust flow is directed to the bypass via control of a bypass valve. This maintains the storage catalyst in a state with contaminant storage capacity available for a subsequent cold start or low temperature operating condition.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
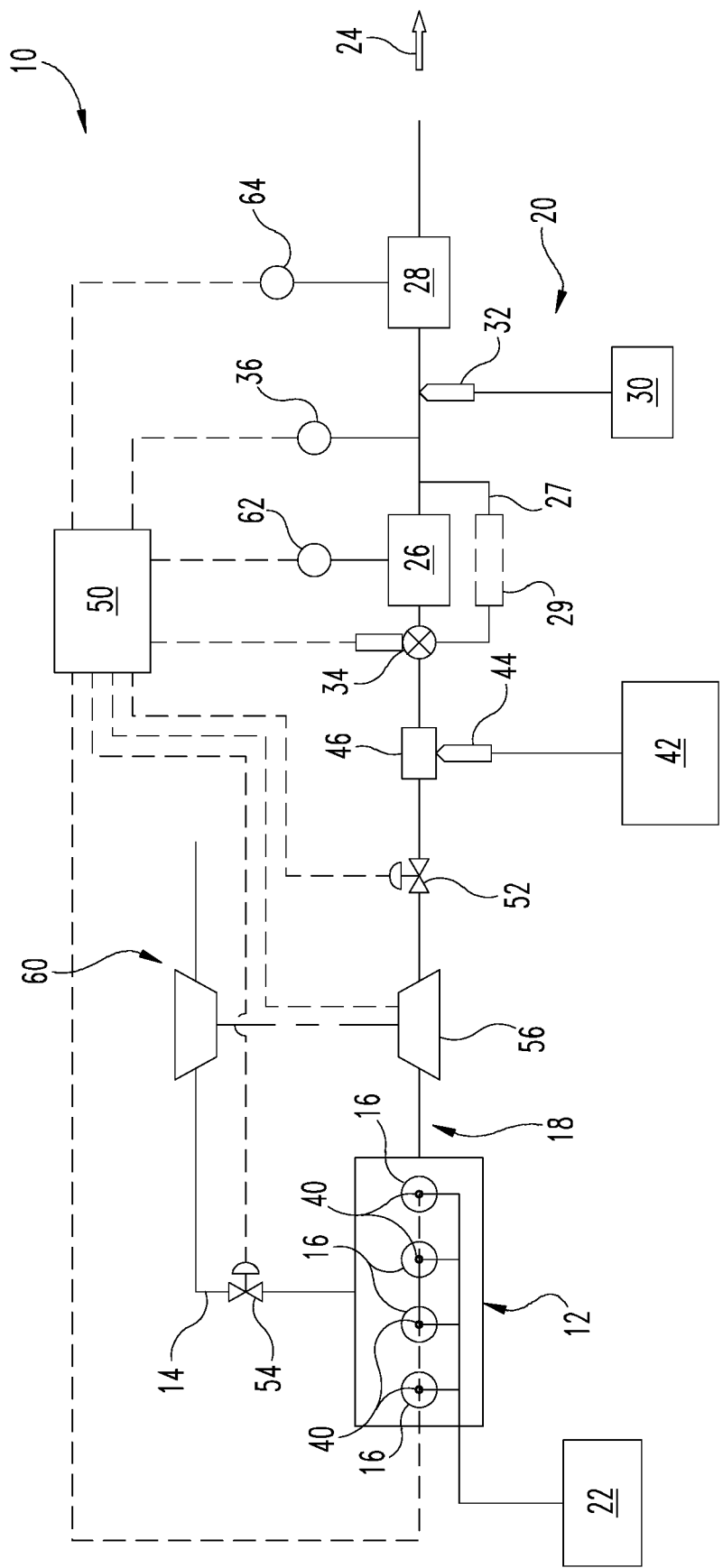
FIG. 1 is a schematic of one embodiment of an internal combustion engine and aftertreatment system including a contaminant storage catalyst and a $NO_x$ reduction catalyst.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

As shown in FIG. 1, an exemplary internal combustion engine system 10 includes an internal combustion engine 12 that receives fuel from at least one fuel source 22 and combusts the fuel with a charge flow from intake system 14 in a plurality of cylinders 16. The combusted charge flow/fuel mixture exits cylinders 16 as exhaust gas via an exhaust flow 24 into an exhaust system 18. Exhaust system 18 includes an aftertreatment system 20 that is configured to store $NO_x$ and hydrocarbons via, for example, adsorption on a catalyst substrate during certain operating conditions, as discussed further below. In one embodiment, engine 12 is a diesel engine. Engine 12 is shown with four cylinders 16 that may be configured in an in-line arrangement as shown, but any suitable cylinder arrangement and number of cylinders for an internal combustion engine are contemplated.

Engine 12 receives fuel from fuel source 22 via any suitable arrangement. For example, in the illustrated embodiment, fuel source 22 is connected to cylinders 16 with at least one fuel line and a plurality of direct injectors 40. One or more direct injectors 40 may be associated with each cylinder 16 at any suitable injection location. In other embodiments, the fuel injectors include port injectors, or injection of fuel into intake system 14 upstream of cylinders 16. One or more fuel control valves can control the amount, duration, and timing of fuel injection into cylinders 16. In one embodiment, the direct injectors 40 are operated by a controller 50 to provide a post-combustion injection of fuel that inserts unburned hydrocarbons into the exhaust gas flow for management and control of exhaust gas temperatures. In another embodiment, a hydrocarbon source 42 that is in addition to fuel source 22 is provided with a hydrocarbon injector 44 for injection of hydrocarbons directly into the exhaust stream downstream of cylinders 16. In yet another embodiment, injector 44 is connected to fuel source 22.

System 10 may further include various features, such as a turbocharger 60, an exhaust gas recirculation system (not shown), a charge air cooler or intercooler(not shown), variable geometry turbine 56, an intake throttle 54, and/or exhaust throttle 52. In any arrangement, aftertreatment system 20 includes a storage catalyst 26 that receives exhaust flow 24 from engine 12 and provides storage of contaminants such as $NO_x$ and/or hydrocarbons that is produced by engine 12, at least under certain operating conditions. Storage catalyst 26 can be a passive $NO_x$ adsorber or a diesel cold start catalyst, for example.

Aftertreatment system 20 also includes a $NO_x$ reduction catalyst 28, such as an SCR catalyst, downstream of storage catalyst 26. Aftertreatment system 20 is also connected to a reductant source 30 at a second location that is downstream of the $NO_x$ adsorption location and upstream of at least the $NO_x$ reduction catalyst 28. Reductant source 30 can include, for example, diesel exhaust fluid, urea, ammonia derived from urea, ammonia gas, a solid storage media that stores ammonia gas until heated above a threshold release temperature, or any suitable reductant and reductant delivery system. The reductant from reductant source 30 can be delivered to aftertreatment system 20 with a reductant injector 32. Air assisted reductant delivery systems and systems without air assistance are contemplated.

Aftertreatment system 20 can be connected to any one or more temperature generation devices 46 that provide an operating condition output into system 10, such as by increasing or decreasing a temperature of the exhaust flow 24 upstream of storage catalyst 26. The temperature generation device 46 may include an exhaust heating apparatus that includes a source of additional reductant 42 that includes, for example, $H_2$, small and long chain hydrocarbons (liquid or gaseous) that are provided to an optional thermal device, or hydrocarbons (liquid or gaseous) that are injected by hydrocarbon doser or injector 44 upstream of storage catalyst 26. Any thermal device is contemplated, including a thermal generator or thermal enhancer, such as a catalytic burner, rich burner, or lean burner. Other temperature generation devices 46 that provide heat to or facilitate the increase in heat of exhaust flow 24 upstream of the storage catalyst 26 include, for example, fuel injectors such as direct injectors 40 operated by controller 50 to provide the late post-combustion injection of fuel into the exhaust gas produced by the respective cylinder 16 or that controls fuelling in cylinders 16 to a rich condition to provide hydrocarbons into the exhaust flow 24.

In one embodiment storage catalyst 26 is a separate catalyst device that readily passively adsorbs and stores $NO_x$ and hydrocarbons on its surface under low exhaust temperature conditions, and then desorbs this $NO_x$ and oxidizes the stored hydrocarbons as the exhaust temperature increases and therefore as the temperature of storage catalyst 26 increases. The passive storage catalyst 26 is configured to release the stored $NO_x$ at an exhaust flow temperature or temperature range where the temperature of the $NO_x$ reduction catalyst 28 is effective for reducing $NO_x$ to $N_2$ and $H_2O$, and/or to oxidize stored hydrocarbons when a light-off temperature is reached, hereinafter referred to as a release temperature threshold. In a further embodiment, aftertreatment system 20 includes a bypass 27 around storage catalyst 26. Bypass 27 can be empty (i.e. lack any oxidation or other catalyst) or include an optional oxidation catalyst 29. Bypass 27 further includes a bypass control valve 34. As discussed further below, bypass control valve 34 is controllable to selectively direct exhaust flow through storage catalyst 26 or through bypass 27.

Aftertreatment system 20 enables $NO_x$ storage on storage catalyst 26 in a $NO_x$ storage mode of operation at low exhaust temperatures when $NO_x$ reduction catalyst 28 is not active, and releases the stored $NO_x$ in a $NO_x$ release mode of operation when $NO_x$ reduction catalyst 28 is at a temperature effective for $NO_x$ conversion and storage catalyst 26 is above the release temperature threshold. In one embodiment, the effective temperature for efficient $NO_x$ conversion by $NO_x$ reduction catalyst 28 is a temperature above about 200° C., although other effective temperature thresholds are contemplated depending on catalyst formulation, feed gas composition, and other parameters. As used herein a low temperature condition and/or a cold start condition is a condition in which the temperature of $NO_x$ reduction catalyst 28 is less than the effective temperature threshold of $NO_x$ reduction catalyst 28, and the release temperature threshold is above 200° C.

The release of $NO_x$ and/or oxidation of hydrocarbons from storage catalyst 26 in the release modes of operation can be managed by controlling the heating of storage catalyst 26 with one or more of the temperature generation devices 46. The heating of exhaust flow 24 and storage catalyst 26 to a $NO_x$ release temperature, $NO_x$ release temperature range, and/or HC oxidation temperature (light-off temperature) can be actively managed, and/or can occur as a result of nominal operations of engine 12. The low temperature storage of $NO_x$ by storage catalyst 26 allows delay of injection of reductant from reductant injector 32 until higher operating temperatures for $NO_x$ reduction catalyst 28 are reached, such as those above the effective temperature threshold.

System 10 includes controller 50 that is operationally coupled to various sensors, actuators and components of system. The controller 50 may be in communication with any sensor, actuator, datalink, and/or network in the system 10. In certain embodiments, the controller 50 forms a portion of a processing subsystem including one or more computing devices having memory, processing, and communication hardware. The controller 50 may be a single device or a distributed device, and the functions of the controller 50 may be performed by hardware or instructions encoded on a computer readable medium that is non-transitory. The controller 50 may be included within, partially included within, or completely separated from an engine controller (not shown). The controller 50 is in communication with any sensor or actuator throughout the system 10, including through direct communication, communication over a datalink, and/or through communication with other controllers or portions of the processing subsystem that provide sensor and/or actuator information to the controller 50.

In certain embodiments, the controller 50 can functionally execute certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted or determined to be the parameter value.

In FIG. 1, controller 50 is operably connected an actuator of bypass valve 34 to open and close bypass valve 34 to selectively direct exhaust flow through one of storage catalyst 26 and bypass 27. Controller 50 is also operably connected to a first sensor 36 downstream of storage catalyst 26. First sensor 36 can be, for example, a $NO_x$ sensor that includes various signal components, one of which is an oxygen component signal that provides a signal indicative of an oxygen amount downstream of storage catalyst 26. First sensor 36 can also provide a measurement of a $NO_x$ amount that is released from storage catalyst 26. In still other embodiments, first sensor 36 could be an $O_2$ or lambda sensor instead of, or in addition to, a $NO_x$ sensor. Controller 50 may also be connected to other sensors, such as temperature sensor 64 that measures an exhaust temperature at or near $NO_x$ reduction catalyst 28, a temperature sensor 62 at storage catalyst 26, or temperature sensor(s) anywhere along the exhaust system and/or at any component of the exhaust system. Controller 50 may also be connected to sensors that provide $NO_x$ amounts, ammonia amounts, pressure conditions, and engine operating parameters, for example. Controller 50 is operable to interpret the operating parameters and signals and control one or more operating outputs of system 10 in response thereto.

Figure 2:
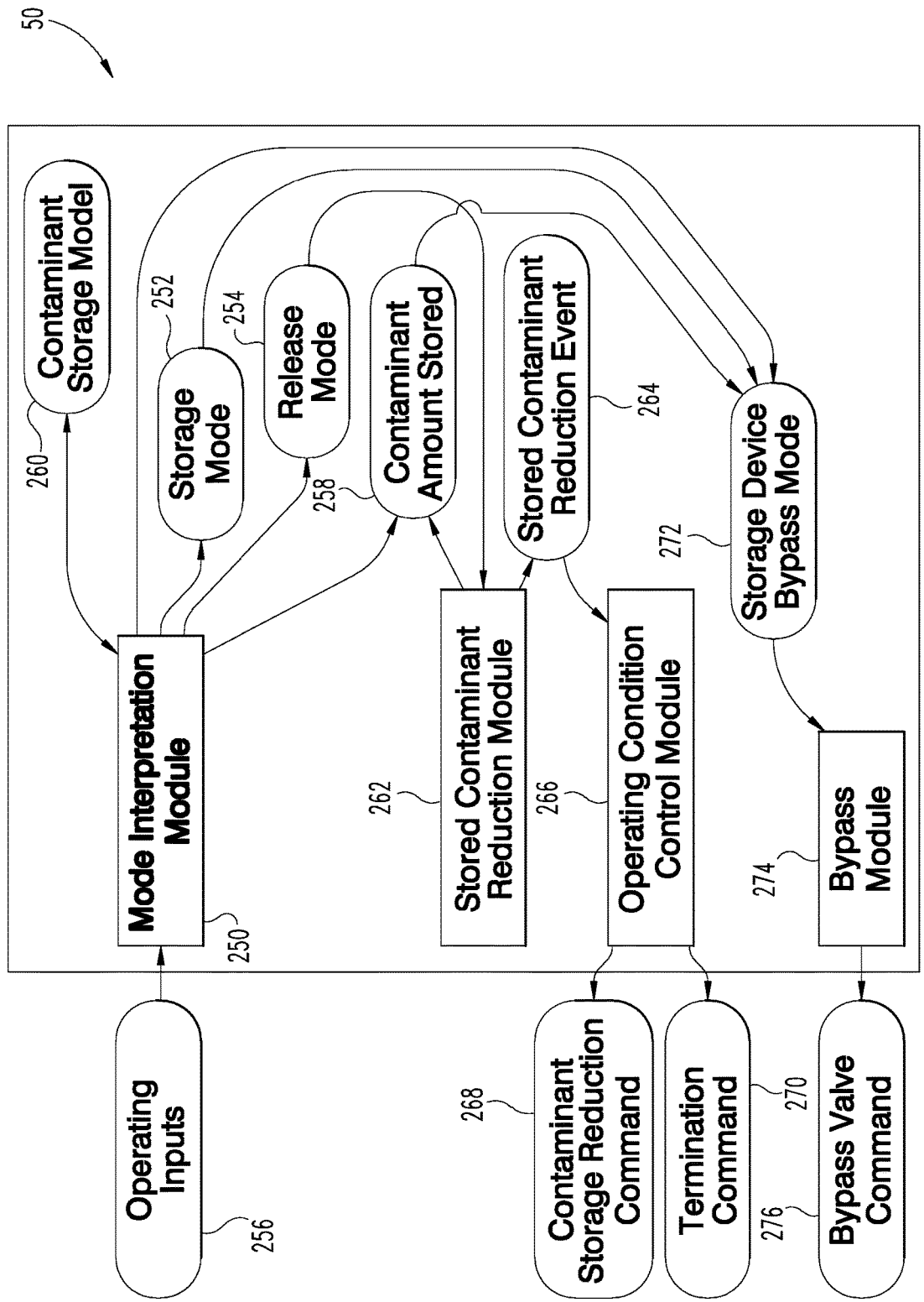
FIG. 2 is a schematic of one embodiment of a controller apparatus for operating an internal combustion engine and an aftertreatment system including a contaminant storage catalyst and a $NO_x$ reduction catalyst.

In one embodiment, such as shown in FIG. 2, the output from controller 50 includes a mode interpretation module 250 that makes a determination that the storage catalyst 26 is operating in a contaminant storage mode 252 or a contaminant release mode 254. Using sensors 36, 62, operating parameter inputs 256 such as the amount of contaminants being released and/or temperature of storage catalyst 26 can be determined and used to interpret the mode of operation. For example, the storage catalyst 26 can be considered to be in a storage mode 252 at certain temperatures or below certain temperature thresholds, or when a contaminant amount measured by first sensor 36 is below a certain threshold.

In a further embodiment, the output from controller 50, such as from mode interpretation module 250 or other suitable module, includes a determination of the contaminant amount stored 258 on the passive storage catalyst 26. A model 260 stored in a memory of controller 50 determines a contaminant amount stored 258 on storage catalyst 26 in response to operating parameter inputs 256 of a $NO_x$ amount (modelled or sensed) upstream of storage catalyst 26, and/or an HC amount upstream of the storage catalyst 26, and/or a temperature of the exhaust gas at or on a substrate of storage catalyst 26. Based on stored contaminant reduction module 262 determining the contaminant amount stored 258 exceeds a first threshold amount, and/or an available storage capacity of the storage catalyst 26 being less than a desired threshold amount, a stored contaminant reduction event 264 can be initiated by controller 50 to release the stored contaminants so that storage capacity is available for a subsequent cold start or low temperature operating condition.

The response to the stored contaminant reduction event 264 can include, for example, an operating condition control module 266 of controller 50 initiating one or more operating condition outputs through a contaminant storage reduction command 268 that increases a temperature of the storage catalyst 26 to initiate a release mode of operation to reduce contaminant storage levels on storage catalyst 26. The operating condition outputs can be initiated through, for example, temperature generation device 46, which may include an exhaust heating apparatus that includes a source of reductant such as $H_2$, small and long chain hydrocarbons (liquid or gaseous) that are provided to an optional thermal device, or hydrocarbons (liquid or gaseous) that are injected by hydrocarbon doser or injector 44 upstream of storage catalyst 26. Any thermal device is contemplated, including a thermal generator or thermal enhancer, such as a catalytic burner, rich burner, or lean burner. Other temperature generation devices that can be controlled by controller 50 to provide an operating condition output to provide heat to or facilitate the increase in heat of exhaust flow 24 upstream of the storage catalyst 26 include, for example, fuel injectors such as direct injectors 40 operated by controller 50 to provide the late post-combustion injection of fuel into the exhaust gas produced by the respective cylinder 16. Other temperature generation devices include one or more engine levers, such as exhaust throttle 52 actuated by controller 50, intake throttle 54 actuated by controller 50, turbine 56 having a controllable inlet actuated by controller 50 to be positioned in a high exhaust backpressure position, a variable valve timing device (not shown) associated with cylinders 16 operable by controller 50 to vary the lift profile of the valves of cylinders 16 to control exhaust temperatures, and an operating state of engine 12 produced by controller 50 that produces increased exhaust gas temperatures Operating condition control module 266 of controller 50 can further be configured to provide a termination command 270 to terminate the stored contaminant reduction event in response to the available storage capacity of storage catalyst 26 being less than a second threshold amount. The second threshold amount can be associated with, for example, a desired available storage capacity of storage catalyst 26 being available for a subsequent cold start or low temperature operating condition.

In a further embodiment, the system operating condition output from mode interpretation module 250 of controller 50 is a storage device bypass mode 272 of operation in response to storage catalyst 26 being at or above a threshold temperature condition where contaminant storage capacity is low and there is little or no contaminants stored on storage catalyst 26. Alternatively or additionally, using the contaminant storage model 260 discussed above, mode interpretation module 250 of controller 50 can determine that the storage device 26 has a contaminant amount stored 258 that is at or below a cold start storage capacity threshold. The cold start capacity threshold indicates that storage catalyst 26 has desorbed sufficient contaminants to be able to absorb a sufficient amount of contaminants produced by a subsequent cold start condition. The storage catalyst bypass mode 272 is interpreted by bypass module 274 to provide a bypass valve command 276 that controls bypass valve 34 to direct exhaust flow 24 through bypass 27, preserving the storage capacity of storage catalyst 26 for a subsequent cold start condition or low temperature operating condition without requiring implementation of the thermal management strategies discussed above to maintain the storage capacity. Furthermore, $N_2O$ production in the exhaust flow 24 during thermal management is minimized by implementing bypass 27 since storage catalyst 26 can make $N_2O$ in the presence of hydrocarbons.

In the embodiment with an empty bypass 27, exhaust flow 24 can be redirected through storage catalyst 26 during DPF regeneration to provide contaminant storage while the DPF regenerates. In the embodiment of bypass 27 with an oxidation catalyst 29, exhaust flow 24 can continue to be directed through bypass 27 during DPF regeneration. During cold start conditions and/or low temperature operating conditions, bypass valve 34 is controlled by controller 50 to direct exhaust flow 24 through storage catalyst 26 so that contaminants are stored while $NO_x$ reduction catalyst 28 is below its effective operating temperature.

Figure 3:
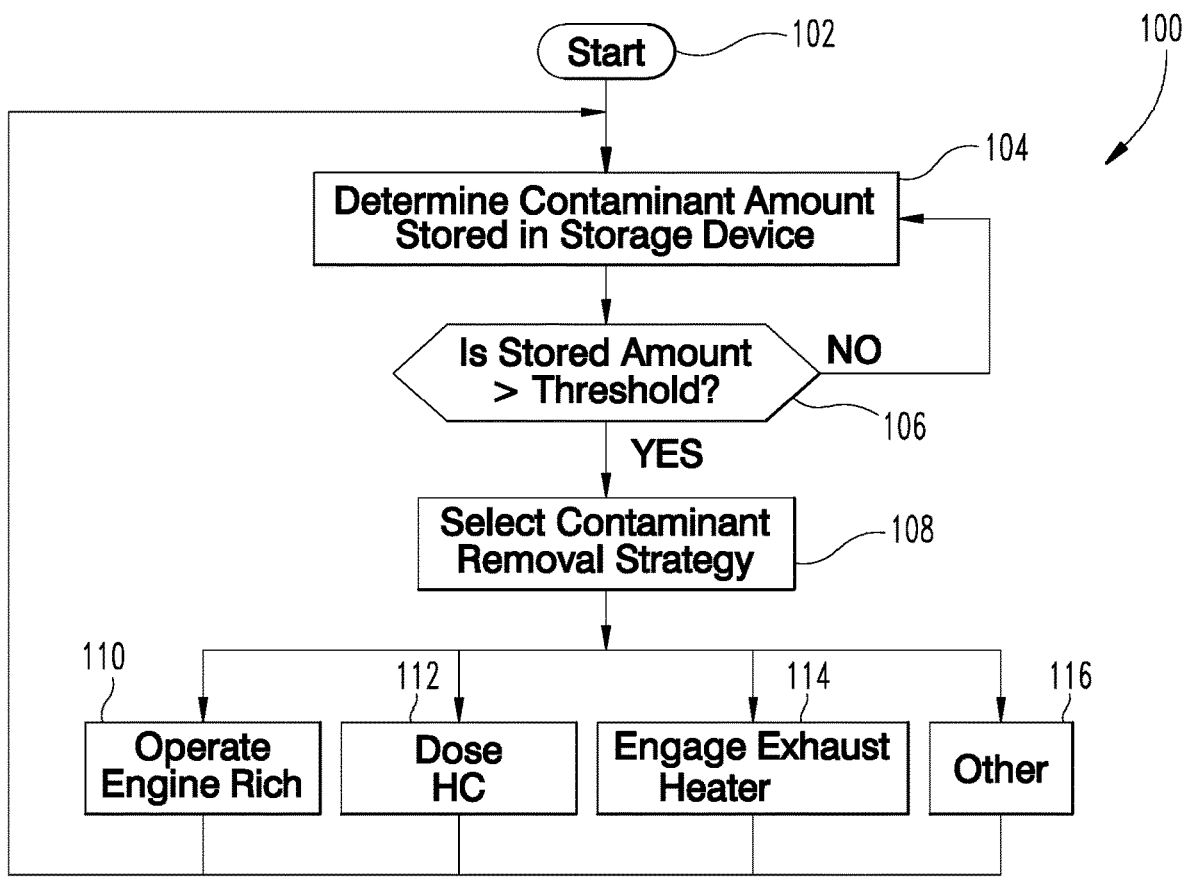
FIG. 3 is a schematic of a procedure for operating an internal combustion engine and an aftertreatment system including a contaminant storage catalyst and a $NO_x$ reduction catalyst.

Also contemplated are methods and procedures associated with the systems described above. For example, referring to FIG. 3, a procedure 100 starts at 102 with the internal combustion engine 12 producing an exhaust flow passing through storage catalyst 26. At least one of the $NO_x$ and hydrocarbons in the exhaust flow is stored with the storage catalyst 26 during a storage mode of operation when the exhaust flow 24 and $NO_x$ storage catalyst 28 is in a cold start and/or low temperature condition. Procedure 100 includes an operation 104 to determine a contaminant amount stored on storage catalyst 26. The contaminant amount can be determined by a model stored in controller 50 in response to inputs of one or more operating parameters, such as a $NO_x$ amount upstream of storage catalyst 26, a hydrocarbon amount upstream of storage catalyst 26, and/or a temperature condition, such as an accumulated time-temperature, average temperature, etc., of storage catalyst 26. Procedure 100 continues at conditional 106 in which the stored amount of contaminants is compared to a first threshold. If the stored amount is less than the threshold, storage capacity is available on storage catalyst 26 and procedure 100 returns to operation 104.

If conditional 106 of procedure 100 is positive, procedure 100 continues at operation 108 to initiate a stored contaminant removal event in which one or more operating conditions are selected for a contaminant removal strategy to reduce the amount of contaminants stored on storage catalyst 26. The operating condition outputs for the contaminant removal strategy can include any one or combination of suitable operations that increase the temperature of storage catalyst 26 to release the stored contaminates and provide an available storage capacity for a subsequent cold start or low temperature operating condition. Example strategies include an operation 110 to operate the engine 12 in a rich condition, an operation 112 to dose hydrocarbons in-cylinder and/or in the exhaust flow at temperature generation device 46, an operation 114 to engage an exhaust heater, or any other temperature increasing device or strategy 116 discussed herein.

Figure 4:
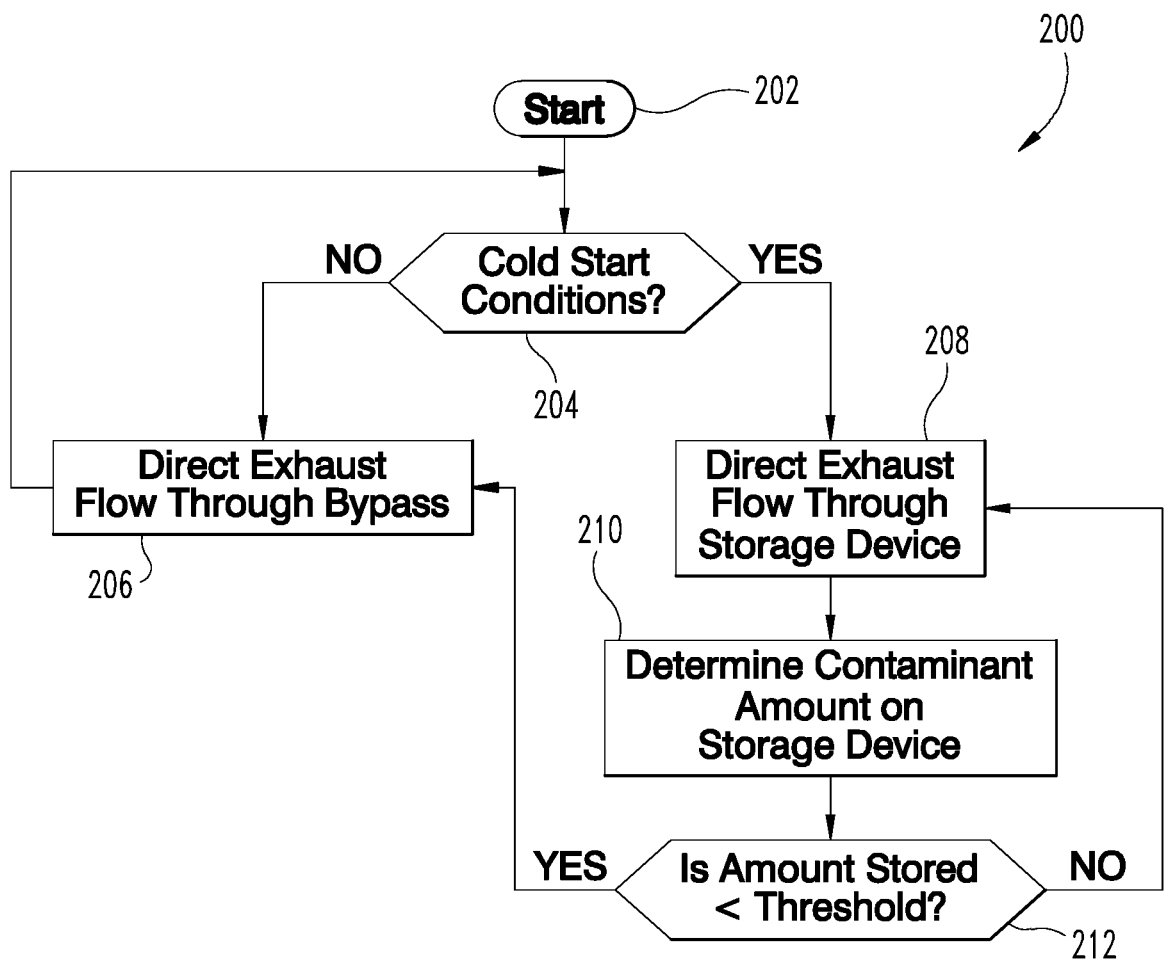
FIG. 4 is a schematic of another embodiment procedure for operating an internal combustion engine and aftertreatment system including a contaminant storage catalyst and a $NO_x$ reduction catalyst.

In another example, referring to FIG. 4, a procedure 200 starts at 202 with the internal combustion engine 12 producing an exhaust flow passing through storage catalyst 26. At least one of the $NO_x$ and hydrocarbons in the exhaust flow is stored with the storage catalyst 26 during a storage mode of operation when the exhaust flow 24 and/or $NO_x$ storage catalyst 28 is in a cold start or low temperature condition. Procedure 200 includes a conditional 204 to determine if the engine and/or aftertreatment system is operating under a cold start and/or low temperature operating condition. Determination of a cold start/low temperature operating condition can be based on any one or combination of operating parameters, such as the temperature of engine 12, the exhaust flow temperature, the temperature of storage catalyst 26, the temperature of $NO_x$ reduction catalyst 28, or other operating condition or temperature, for example.

If conditional 204 is negative, procedure 200 continues at operation 206 to direct the exhaust flow through a storage catalyst bypass, such as bypass 27 discussed above. If conditional 204 is positive, procedure 200 continues at operation 208 to direct exhaust flow 24 through storage catalyst 26. In performance of operations 206, 208, bypass valve 34 can be controlled by a command issued by controller 50 to an electronic or pneumatic actuator of bypass valve 34 to move bypass valve 34 to the correct position to close one of the flow paths and allow exhaust flow through the other of the flow paths.

While exhaust flow 24 is directed through storage catalyst 26, procedure 200 continues at operation 210 to determine a contaminant amount on storage catalyst 26. The determination of the contaminant amount stored on storage catalyst 26 can be made using a model stored in controller 50 that determines a contaminant amount stored on storage catalyst 26 in response to inputs of one or more operating parameters, such as a $NO_x$ amount upstream of storage catalyst 26, a hydrocarbon amount upstream of storage catalyst 26, and/or a temperature condition, such as an accumulated time-temperature, of storage catalyst 26. Procedure 200 continues at conditional 212 to determine if the stored contaminant amount is less than a threshold amount associated with a desired amount of storage capacity for a cold start condition. If conditional 212 is negative, procedure 200 returns to operation 208 to continue to direct the exhaust flow through the storage catalyst 26 and operate with an operating strategy to provide a contaminant release mode of operation. If conditional 212 is positive, procedure 200 returns to operation 206 to manipulate the bypass valve 34 and direct exhaust flow 24 through bypass 27 so that the available storage capacity is maintained for a subsequent cold start or low temperature operating condition.

Various aspects of the present disclosure are contemplated. According to one aspect, a method includes operating an internal combustion engine to produce an exhaust flow to an aftertreatment system including at least a storage catalyst for storing contaminants in the exhaust flow and a $NO_x$ reduction catalyst downstream of the storage catalyst; storing a contaminant from the exhaust flow with the storage catalyst during a contaminant storage mode of operation that occurs when the $NO_x$ reduction catalyst is currently in at least one of a cold start operating condition and a low temperature operating condition; determining a contaminant amount stored on the storage catalyst is greater than a first threshold amount, where the first threshold amount is indicative of a lack of available storage capacity for the $NO_x$ reduction catalyst during one or more of a subsequent cold start operating condition and a subsequent low temperature operating condition; and increasing a temperature of the storage catalyst above a contaminant release temperature threshold to release contaminants from the storage catalyst to increase an available storage capacity of the storage catalyst for the one or more of the subsequent cold start operating condition and the subsequent low temperature operating condition.

In one embodiment, the method includes increasing the temperature of the storage catalyst includes a thermal management operation that includes at least one of: operating the internal combustion engine in a rich condition, injecting hydrocarbons in the exhaust flow, engaging an exhaust heater to increase a temperature of the exhaust flow, and controlling an engine operating lever to increase a temperature of the exhaust flow. In another embodiment, the $NO_x$ reduction catalyst is a selective catalytic reduction (SCR) catalyst and the aftertreatment system includes a reductant source operationally to provide an ammonia based reductant upstream of the SCR catalyst and downstream of the storage catalyst.

In yet another embodiment, the method includes determining the contaminant amount stored on the storage catalyst is less than a second threshold amount that is less than the first threshold amount and directing the exhaust flow through a bypass around the storage catalyst in response to the contaminant amount being less than the second threshold amount. In a refinement of this embodiment of the method, directing the exhaust flow includes operating a bypass valve that opens the bypass and closes a flow path through the storage catalyst. In yet a further refinement, the bypass includes an oxidation catalyst therein.

In another embodiment of the method, determining the contaminant amount includes modeling the contaminant amount stored on the storage catalyst based on at least one of a temperature of the storage catalyst, a $NO_x$ amount produced by the internal combustion engine upstream of the storage catalyst, and a hydrocarbon amount in the exhaust flow upstream of the storage catalyst. In a refinement of this embodiment, updating the contaminant amount in response to an output of a second contaminant amount from a contaminant sensor downstream of the storage catalyst.

According to another aspect of the present disclosure, an apparatus includes an electronic controller operationally connectable with an aftertreatment system including at least a storage catalyst for storing contaminants in the exhaust flow and a $NO_x$ reduction catalyst downstream of the storage catalyst. The controller is configured to determine a contaminant amount stored on the storage catalyst and initiate a stored contaminant reduction event in response to the contaminant amount stored on the storage catalyst exceeding a first threshold amount and the $NO_x$ reduction catalyst being above an effective operating temperature. The electronic controller is further configured to terminate the stored contaminant reduction event in response to the contaminant amount on the storage catalyst being less than a second threshold amount, where the second threshold amount is less than the first threshold amount and is indicative of an effective storage capacity for a subsequent cold start operating condition of the $NO_x$ reduction catalyst.

In one embodiment, the electronic controller is operationally connect to a bypass valve and is configured to control the bypass valve to direct the exhaust flow through a bypass around the storage catalyst in response to terminating the stored contaminant reduction event. In a refinement of this embodiment, the bypass includes an oxidation catalyst. In another embodiment, the bypass is an empty flow path around the storage catalyst, and the controller is configured to control the bypass valve to direct the exhaust flow through the storage catalyst in response to a particulate filter regeneration event.

In another embodiment, the controller is configured to initiate the stored contaminant reduction event by increasing a temperature of the storage catalyst to release contaminants stored on the storage catalyst. In a refinement of this embodiment, the controller is configured to increase the temperature of the storage catalyst by at least one of: control the internal combustion engine to operate in a rich condition, control a doser to inject hydrocarbons in the exhaust flow, engage an exhaust heater, and control an engine operating lever to increase a temperature of the exhaust flow.

In another aspect of the present disclosure, a method includes: operating an internal combustion engine to produce an exhaust flow to an aftertreatment system including at least a storage catalyst for storing contaminants in the exhaust flow and a $NO_x$ reduction catalyst downstream of the storage catalyst; storing a contaminant from the exhaust flow with the storage catalyst during a contaminant storage mode of operation that occurs in response to the $NO_x$ reduction catalyst being in at least one of a cold start operating condition and a low temperature operating condition; determining a contaminant amount stored on the storage catalyst is greater than a first threshold amount and a temperature of the $NO_x$ reduction catalyst is above an effective operating temperature; reducing the contaminant amount stored on the storage catalyst in response to the contaminant amount on the storage catalyst being greater than the first threshold amount and the temperature of the $NO_x$ reduction catalyst being above the effective operating temperature; and terminating the reduction of the contaminant amount stored on the storage catalyst in response to the contaminant amount stored on the storage catalyst being less than a second threshold amount that is less than the first threshold amount, where the second threshold amount is indicative of an effective storage capacity for the one or more of the subsequent cold start operating condition and the low temperature operating condition of the $NO_x$ reduction catalyst.

In one embodiment of the method, reducing the contaminant amount stored includes increasing a temperature of the storage catalyst above a contaminant release temperature threshold to release contaminants from the storage catalyst to increase an available storage capacity of the storage catalyst for the one or more of the subsequent cold start operating condition and the subsequent low temperature operating condition. In a refinement of this embodiment of the method, increasing the temperature of the storage catalyst includes a thermal management operation that includes at least one of: operating the internal combustion engine in a rich condition, injecting hydrocarbons in the exhaust flow, engaging an exhaust heater to increase a temperature of the exhaust flow, and controlling an engine operating lever to increase a temperature of the exhaust flow.

In another embodiment of the method, terminating the reduction of the contaminant amount stored on the storage catalyst further includes directing the exhaust flow through a bypass around the storage catalyst in response to the contaminant amount being less than the second threshold amount. In a refinement of this embodiment, directing the exhaust flow includes operating a bypass valve that opens the bypass and closes a flow path through the storage catalyst. In a further refinement, the bypass includes an oxidation catalyst therein.

In another aspect of the present disclosure, an apparatus includes an electronic controller operationally connectable with an aftertreatment system including at least a storage catalyst for storing contaminants in the exhaust flow and a $NO_x$ reduction catalyst downstream of the storage catalyst. The controller is configured to determine a contaminant amount stored on the storage catalyst is greater than a first threshold amount and a temperature of the $NO_x$ reduction catalyst is above an effective operating temperature and reduce the contaminant amount stored on the storage catalyst in response to the contaminant amount on the storage catalyst being greater than the first threshold amount and the temperature of the $NO_x$ reduction catalyst being above the effective operating temperature. The controller is further configured to terminate the reduction of the contaminant amount stored on the storage catalyst in response to the contaminant amount stored on the storage catalyst being less than a second threshold amount that is less than the first threshold amount, where the second threshold amount is indicative of an effective storage capacity for the one or more of the subsequent cold start operating condition and the low temperature operating condition of the $NO_x$ reduction catalyst While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an internal combustion engine to produce an exhaust flow to an aftertreatment system including at least a $NO_x$ storage catalyst for storing $NO_x$ contaminants in the exhaust flow and a $NO_x$ reduction catalyst downstream of the $NO_x$ storage catalyst;
    storing a $NO_x$ contaminant from the exhaust flow with the $NO_x$ storage catalyst during a contaminant storage mode of operation that occurs when the $NO_x$ reduction catalyst is currently in at least one of a cold start operating condition and a low temperature operating condition;
    determining a $NO_x$ contaminant amount stored on the $NO_x$ storage catalyst is greater than a first threshold amount, wherein the first threshold amount is indicative of a lack of available $NO_x$ storage capacity for the $NO_x$ reduction catalyst during one or more of a subsequent cold start operating condition and a subsequent low temperature operating condition; and
    initiating a stored $NO_x$ contaminant reduction event in response to the $NO_x$ contaminant amount stored on the $NO_x$ storage catalyst exceeding a first threshold amount and the $NO_x$ reduction catalyst being above an effective operating temperature by increasing a temperature of the $NO_x$ storage catalyst above a contaminant release temperature threshold to release $NO_x$ contaminants from the $NO_x$ storage catalyst to be less than a cold start capacity threshold that is indicative of an available $NO_x$ storage capacity of the $NO_x$ storage catalyst for the one or more of the subsequent cold start operating condition and the subsequent low temperature operating condition, and further comprising bypassing the exhaust flow around the $NO_x$ storage catalyst in response to terminating the stored $NO_x$ contaminant reduction event to maintain the available $NO_x$ storage capacity to be less than the cold start capacity threshold.

2. The method of claim 1, wherein increasing the temperature of the $NO_x$ storage catalyst includes a thermal management operation comprising at least one of: operating the internal combustion engine in a rich condition, injecting hydrocarbons in the exhaust flow, engaging an exhaust heater to increase a temperature of the exhaust flow, and controlling an engine operating lever to increase a temperature of the exhaust flow.

3. The method of claim 1, wherein the $NO_x$ reduction catalyst is a selective catalytic reduction (SCR) catalyst and the aftertreatment system includes a reductant source operationally to provide an ammonia based reductant upstream of the SCR catalyst and downstream of the $NO_x$ storage catalyst.

4. The method of claim 1, further comprising:
directing the exhaust flow through a flow path of a bypass around the $NO_x$ storage catalyst.

5. The method of claim 4, wherein directing the exhaust flow includes operating a bypass valve that opens the bypass and closes a flow path through the $NO_x$ storage catalyst.

6. The method of claim 5, wherein the bypass includes an oxidation catalyst therein.

7. The method of claim 1, wherein determining the $NO_x$ contaminant amount includes modeling the $NO_x$ contaminant amount stored on the $NO_x$ storage catalyst based on at least one of a temperature of the $NO_x$ storage catalyst, a $NO_x$ amount produced by the internal combustion engine upstream of the $NO_x$ storage catalyst, and a hydrocarbon amount in the exhaust flow upstream of the $NO_x$ storage catalyst.

8. The method of claim 7, further comprising updating the $NO_x$ contaminant amount in response to an output of a second $NO_x$ contaminant amount from a $NO_x$ contaminant sensor downstream of the $NO_x$ storage catalyst.

9. An apparatus, comprising:
an electronic controller operationally connectable with an aftertreatment system including at least a $NO_x$ storage catalyst for storing $NO_x$ contaminants in the exhaust flow and a $NO_x$ reduction catalyst downstream of the storage catalyst, wherein the controller is configured to determine a $NO_x$ contaminant amount stored on the $NO_x$ storage catalyst and initiate a stored $NO_x$ contaminant reduction event in response to the $NO_x$ contaminant amount stored on the $NO_x$ storage catalyst exceeding a first threshold amount and the $NO_x$ reduction catalyst being above an effective operating temperature, wherein the electronic controller is further configured to terminate the stored $NO_x$ contaminant reduction event in response to the $NO_x$ contaminant amount on the $NO_x$ storage catalyst being less than a second threshold amount, wherein the second threshold amount is less than the first threshold amount and the second threshold amount is a cold start capacity of the $NO_x$ storage catalyst, the cold start capacity indicative of an amount of $NO_x$ storage capacity of the $NO_x$ storage catalyst available for the one or more of a subsequent cold start condition and a subsequent low temperature operating condition, and wherein the controller is further configured to control a bypass valve to bypass the exhaust flow around the $NO_x$ storage catalyst in response to terminating the stored $NO_x$ contaminant reduction event to maintain the cold start $NO_x$ capacity of the $NO_x$ storage catalyst to be less than the second threshold amount.

10. The apparatus of claim 9, wherein the bypass includes an oxidation catalyst.

11. The apparatus of claim 9, wherein the bypass is an empty flow path around the $NO_x$ storage catalyst, and wherein the controller is configured to control the bypass valve to direct the exhaust flow through the $NO_x$ storage catalyst in response to a particulate filter regeneration event.

12. The apparatus of claim 9, wherein the controller is configured to initiate the stored $NO_x$ contaminant reduction event by increasing a temperature of the $NO_x$ storage catalyst to release $NO_x$ contaminants stored on the $NO_x$ storage catalyst.

13. The apparatus of claim 12, wherein the controller is configured to increase the temperature of the $NO_x$ storage catalyst by at least one of: control the internal combustion engine to operate in a rich condition, control a doser to inject hydrocarbons in the exhaust flow, engage an exhaust heater, and control an engine operating lever to increase a temperature of the exhaust flow.

14. A method, comprising:
operating an internal combustion engine to produce an exhaust flow to an aftertreatment system including at least a $NO_x$ storage catalyst for storing $NO_x$ contaminants in the exhaust flow and a $NO_x$ reduction catalyst downstream of the $NO_x$ storage catalyst;

storing a $NO_x$ contaminant from the exhaust flow with the $NO_x$ storage catalyst during a $NO_x$ contaminant storage mode of operation that occurs in response to the $NO_x$ reduction catalyst being in at least one of a cold start operating condition and a low temperature operating condition;

determining a $NO_x$ contaminant amount stored on the $NO_x$ storage catalyst is greater than a first threshold amount and a temperature of the $NO_x$ reduction catalyst is above an effective operating temperature;

reducing the $NO_x$ contaminant amount stored on the $NO_x$ storage catalyst in response to the $NO_x$ contaminant amount on the $NO_x$ storage catalyst being greater than the first threshold amount and the temperature of the $NO_x$ reduction catalyst being above the effective operating temperature; and terminating the reduction of the $NO_x$ contaminant amount stored on the $NO_x$ storage catalyst in response to the $NO_x$ contaminant amount stored on the $NO_x$ storage catalyst being less than a second threshold amount that is less than the first threshold amount, wherein the second threshold amount is a cold start capacity of the $NO_x$ storage catalyst, the cold start capacity indicative of an amount of $NO_x$ storage capacity of the $NO_x$ storage catalyst available for the one or more of the subsequent cold start condition and the subsequent low temperature operating condition, and further comprising bypassing the exhaust flow around the $NO_x$ storage catalyst in response to the terminating the reduction of the $NO_x$ contaminant amount stored on the $NO_x$ storage catalyst to maintain the cold start $NO_x$ capacity of the $NO_x$ storage catalyst.

15. The method of claim 14, wherein reducing the $NO_x$ contaminant amount stored includes increasing a temperature of the $NO_x$ storage catalyst above a contaminant release temperature threshold to release $NO_x$ contaminants from the $NO_x$ storage catalyst.

16. The method of claim 15 wherein increasing the temperature of the $NO_x$ storage catalyst includes a thermal management operation comprising at least one of: operating the internal combustion engine in a rich condition, injecting hydrocarbons in the exhaust flow, engaging an exhaust heater to increase a temperature of the exhaust flow, and controlling an engine operating lever to increase a temperature of the exhaust flow.

17. The method of claim 14, wherein directing the exhaust flow includes operating a bypass valve that opens the bypass and closes a flow path through the $NO_x$ storage catalyst.

18. The method of claim 17, wherein the bypass includes an oxidation catalyst therein.

* * * * *